United States Patent [19]
Kirschke

[11] 4,085,510
[45] Apr. 25, 1978

[54] DEFLECTION DEVICE FOR MEASURING THE INTERIOR OF A CONDUIT

[76] Inventor: John A. Kirschke, P.O. Box 125, Boerne, Tex. 78006

[21] Appl. No.: 708,717

[22] Filed: Jul. 26, 1976

[51] Int. Cl.² .............................................. G01B 5/12
[52] U.S. Cl. .............................................. 33/178 F
[58] Field of Search ............ 33/141 G, 147 K, 174 P, 33/178 E, 178 F

[56] References Cited
U.S. PATENT DOCUMENTS

| | | | |
|---|---|---|---|
| 2,281,960 | 5/1942 | Vacquier | 33/178 E |
| 2,459,499 | 1/1949 | Castel | 33/178 F |
| 2,616,183 | 11/1952 | Roberts | 33/178 E |
| 2,656,613 | 10/1953 | Goble | 33/178 F |
| 2,855,685 | 10/1958 | Barreteau | 33/178 F |
| 3,023,507 | 3/1962 | Camp | 33/178 F |
| 3,058,227 | 10/1962 | Camp | 33/178 F |
| 3,535,803 | 10/1970 | Creek et al. | 33/178 F |

*Primary Examiner*—Richard E. Aegerter
*Assistant Examiner*—Richard R. Stearns
*Attorney, Agent, or Firm*—Willard J. Hodges, Jr.

[57] ABSTRACT

An elongated skid mounted measuring device for utilization in conjunction with a closed circuit TV camera for accurately determining variations in the internal diameter of a conduit. The device comprises a spring loaded deflection arm to which is secured a ruler movably positioned adjacent a reference marker to visually indicate relative movement of the deflecting arm in slidable contact with the interior of a conduit. The device is designed primarily for utilization in conjunction with a closed circuit TV camera. The device is suitable for utilization with any camera means for recording the degree of movement of the deflection arm.

8 Claims, 6 Drawing Figures

DEFLECTION DEVICE FOR MEASURING THE INTERIOR OF A CONDUIT

BACKGROUND OF THE INVENTION

1. Field of the Invention

This invention generally pertains to the art of inspecting and determining the condition of the interior of conduits or pipelines. Deflection arms or slides, magnetic, and sonic means are present in the art. The most prevalent means for determining accurately the interior of conduits or pipelines currently employ closed circuit television cameras. The device of this invention is designed for utilization in conjunction with a small compact elongated television camera mounted on skids for inspecting the interior of a conduit or pipeline.

2. Description of the Prior Art

Various inventions have been patented pertaining to the inspection of the interior of pipelines or conduits. Typical examples are Harrah et al., U.S. Pat. No. 3,761,623, which pertains to a TV camera looking at the side wall of a pipeline. Vernoy, U.S. Pat. No. 3,755,908, discloses a device referred to in the oil industry as a "pig" moving through a pipeline employing callipers or cuplike structure for measuring the variations in the interior of the pipeline. Schmidt, U.S. Pat. No. 3,243,697, and Hall, U.S. Pat. No. 3,162,505, employ magnetic means for inspecting a pipeline. Green et al., U.S. Pat. No. 3,064,127, pertains to an electrical and magnetic survey pig for gas or oil lines and employs a trolley arm and wheels having some resemblance to the present disclosure. The structure of this invention, however, accomplishes its designed purpose employing components substantially different from the prior art.

SUMMARY OF THE INVENTION

The device of this invention incorporates two species. The first species is illustrated in FIG. 1. This species of the invention comprises an adjustable skid mounted device including an elongated compact TV camera incorporating a lighting system in its central elongated component. The first species of the device generally comprises a spring deflection arm mounted on the top of the device by means of a deflection bracket. A guide arm projects forward of the camera and includes a ruler slide. A gauge is secured to the deflection arm and projects down through the ruler slide. In use the deflection arm contacts the interior surface of a conduit being inspected. Variations in the internal contour cause movement of the deflection arm resulting in movement of the ruler which may be observed by the camera.

The second species of the device employs a TV camera mounted on skids as shown in FIG. 5. The skid mounted device includes a deflection arm and a ruler mounted on adjustable skids which are secured in tandem with the TV camera. The deflection arm of the second species is pivotally mounted and incorporates a deflection arm spring, a ruler mounted over a gauge roller which is internally tensioned by means of a running block, sheave, and a ruler spring as illustrated in FIG. 4. The species of the invention of FIG. 3 is essentially a deflection measuring unit for a TV camera with the TV camera observing variations of the ruler as initiated by movement of the deflection arm.

For a detailed description of the construction and operation of the invention in both species, particular reference is made to the attached drawings and the following detailed description wherein identical reference characters are utilized to refer to equivalent components throughout the various views and the detailed description.

DESCRIPTION OF THE PREFERRED EMBODIMENT

Figure 1:
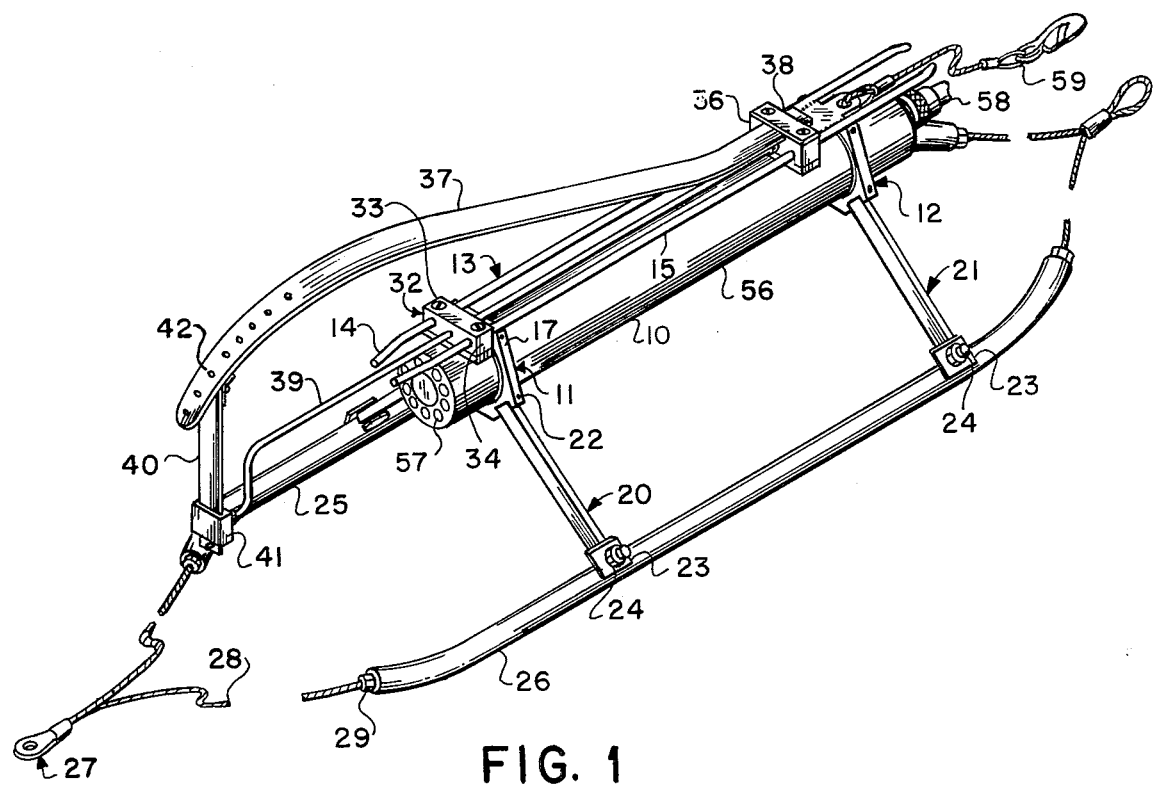
FIG. 1 is a front angular perspective view of the first species of the invention.
Figure 2:
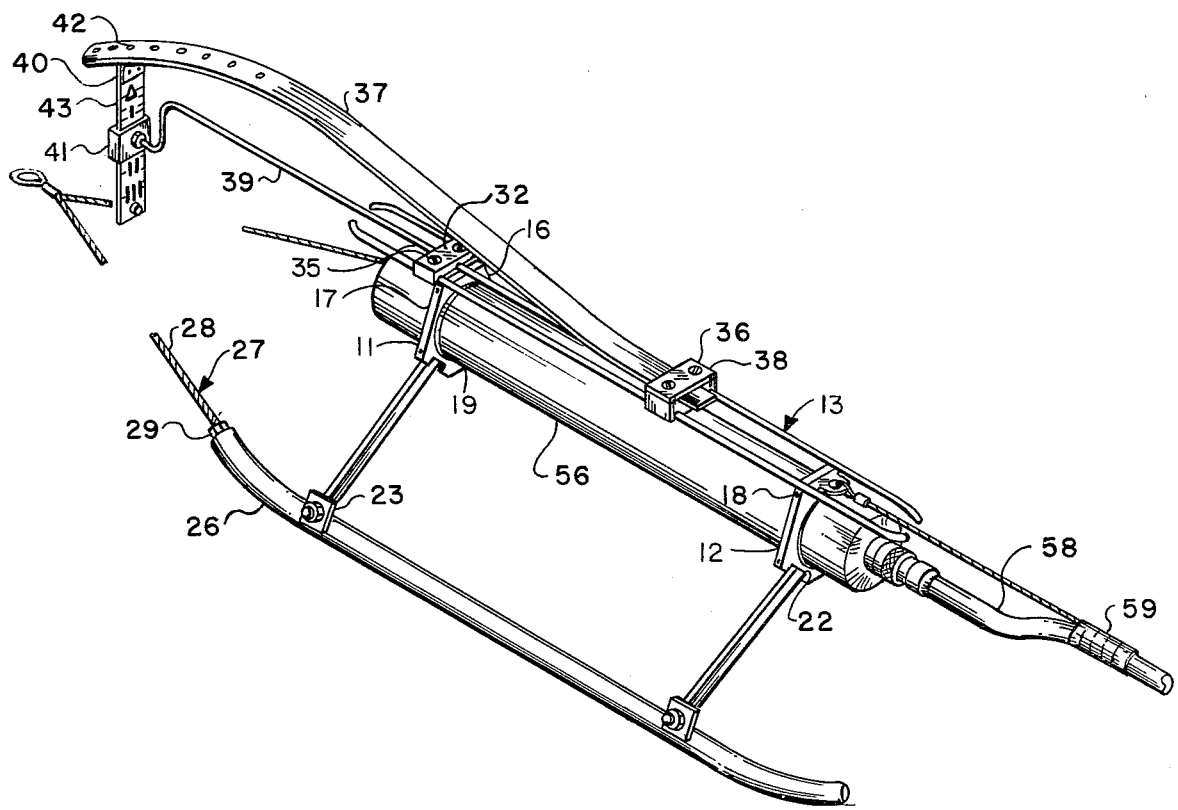
FIG. 2 is a rear angular perspective view of the first species of the invention.

For a description of the construction of the first species of the device reference is made particularly to FIG. 1 and FIG. 2. The central body 10 comprises a tubular aluminum alloy structure approximately 2 inches in diameter and 1 foot 7 inches long. In the first species of the device a TV camera is mounted in the central body 10. In the second species of the device the ruler tensioning components are mounted in the central body 10. Central body mounting structure comprises a segmented first mounting ring 11 and a segmented second mounting ring 12. These mounting rings in the preferred embodiment were constructed from ½ inch aluminum alloy machined to the desired configuration. The upper skid frame 13 may be constructed of ⅜ inch aluminum rod heliarc welded to each side of the segmented mounting rings. In the preferred embodiment the first segment of the upper skid frame 14 secured to the first segment of the mounting rings 16 whereas the second segment 15 of the upper skid frame is heliarc welded to the second segment of the mounting rings 17. Central body 10 may be positioned in the first mounting ring 11 and the second mounting ring 12 and the respective segments secured together by means of top securing screws 18. The mounting rings 11 and 12 may be opened for ease of receiving the central body portion by constructing bottom hinges 19 in each of the rings 11 and 12. Projecting downward from the first mounting ring 11 and the second mounting ring 12 are first ring skid legs 20 and second ring skid legs 21. These legs are constructed from stainless steel strap metal ½ inch wide and ¼ inch thick. In the preferred embodiment these legs were 5 inches long and were secured to the respective mounting rings 11 and 12 by top skid leg hinges 22. The skid legs 20 and 21 project downward to bottom skid brackets 23 wherein the respective legs 20 and 21 are secured by means of bottom skid bracket securing bolts 24. The legs 20 and 21 project downward and are operably attached to first bottom skid 25 and second bottom skid 26. These skids were constructed from ⅜ inch stainless steel rods shaped to the desired configuration with each end of the skids arching slightly upward terminating in threaded portion into which the mounting harness 27, comprising ⅛ inch steel cable 28, is secured by means of threaded plugs 29.

The first species of the device as illustrated in FIG. 1 and FIG. 2 has mounted on the skid and central body combination associated structure comprising a front mounting bracket 32 which comprises a top member 33 and a bottom member 34 which are attached together by securing screws 35. The rear mounting bracket 36 comprises a similar segmented structure. To this rear mounting bracket 36 is secured an arcuate spring steel deflection arm 37. This deflection arm 37 is constructed of ¾ inch stock 1/16 inch thick which was formed to the desired configuration then heated and quenched employing acceptable spring tempering techniques. At the upper extremity of the rear mounting bracket was constructed a deflection arm bracket 38 to which the deflection arm 37 was secured. Projecting forward from the front mounting bracket 32 and the rear mounting bracket 36 was an elongated guide arm 39 of ¼ inch metal rod which projects forward and terminates in a ruler slide 41 in which was slidably positioned ruler 40. The metal ruler extends between the deflection arm 37 and the ruler slide 41, serving as a measuring reference, with the ruler 40 being secured to the deflection arm 37 by ruler attaching means 42. The side of the ruler 40 facing the central body portion 10 in which is mounted a TV camera is normally graduated in reference marks 43 to permit observation of relative movement of the ruler 40 as transmitted by movement of deflection arm 37. The first species of the invention is the singular selfcontained unit including TV camera means and illumination means to observe the relative movement of the ruler 40 as the device progresses through a conduit or pipeline.

Figure 3:
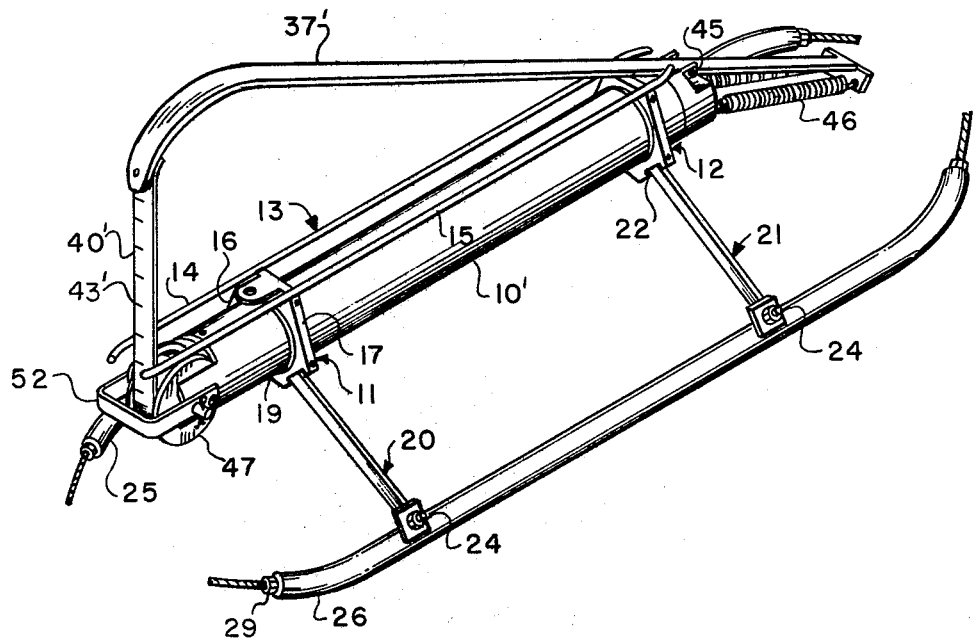
FIG. 3 is a front angular view of the second species of the invention.
Figure 4:
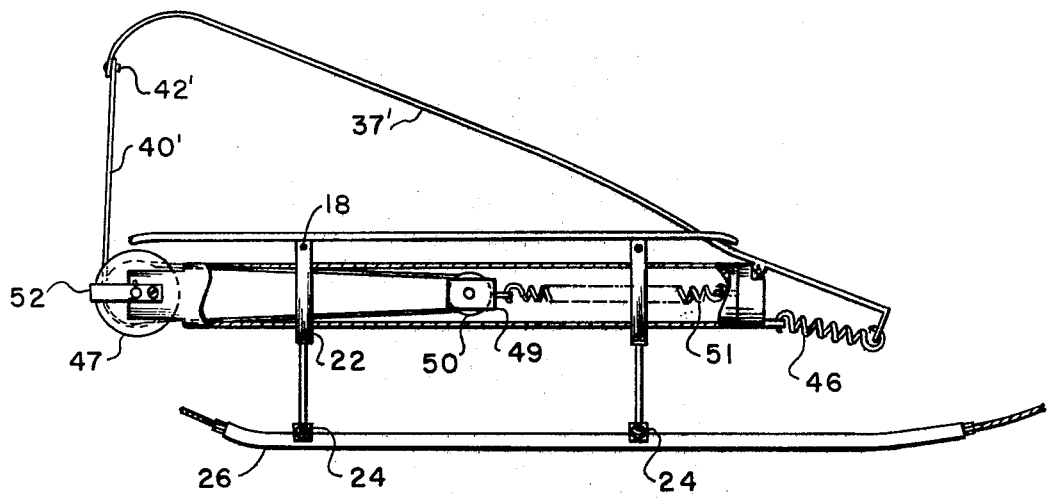
FIG. 4 is a fragmented sectional view of the second species of the invention illustrating the internal components for tensioning the ruler.
Figure 5:
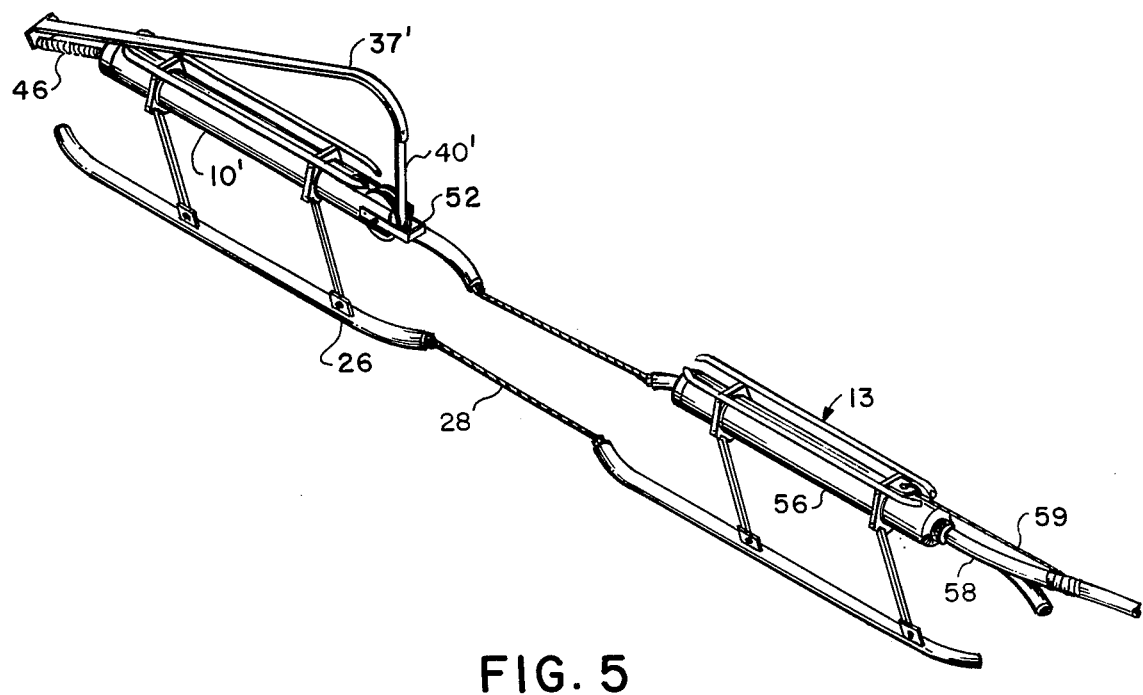
FIG. 5 is a perspective view of the second species of the invention in conjunction with the skid mounted TV camera.

For the construction of the second species of the device reference is particularly made to FIGS. 3, 4 and 5. The skid mounting structure and the central body portion 10 including upper skid frame 13 as well as bottom skids 25 and 26 are identical. The variations in the second species of the device as illustrated in FIG. 3 resides principally in the deflection arm means 37' and ruler 40' means. In the second species of the device the deflection arm 37' comprises a rigid deflection arm 37' which is tiltably mounted on a deflection arm pivot 45. The combination is spring loaded in part by means of deflection arm spring 46 which extends from central body 10' to the end of deflection arm 37'. Mounted in the opposite end of central body 10' is ruler roller 47 over which the ruler 40' projects. Internal of central body 10' in this species of the device is constructed the structure illustrated in FIG. 4. The ruler 40' tensioning mechanism comprises a running block 49 on which is rotatably mounted sheave 50. Extending between block 49 and the end of central body 10' is ruler tensioning spring 51. To protect and insure free rotation of ruler roller 47 and to permit reading of the ruler a bumperlike ruler reference 52 may be employed. The second species of the device is primarily designed to be utilized in conjunction with auxiliary external TV camera means in the manner illustrated in FIG. 5.

Figure 6:
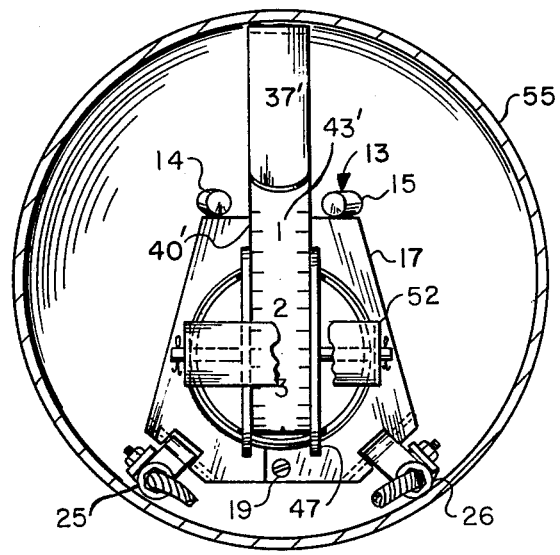
FIG. 6 illustrates the ruler as viewed on the TV monitor in the overall combination.

The devices of this invention are primarily designed to be utilized in conjunction with a closed circuit TV system employing surface mounted monitoring screen as depicted in FIG. 6. The first species and the second species of this invention observe the interior of conduit 55 as schematically illustrated in FIG. 6. A TV camera 56 is internally mounted in central body 10 in the configuration illustrated in FIGS. 1 and 2. These TV cameras would normally include a light means 57 for illuminating ruler 40 and the interior of conduit 55. These TV cameras are interconnected with the surface monitor by means of TV cable 58. To distribute tension on the TV cable 58, particularly at the connecting plug means, a TV cable securing means 59 is attached to each species of the device. This TV cable securing means 59 is illustrated in FIG. 2 with a substantially identical structure being utilized in conjunction with the TV camera 56 of FIG. 5.

OPERATION OF THE DEVICE

FIG. 6 in its schematic depicting of the screen of a television monitor on the surface illustrates the results accomplished by utilization of these devices. The skid devices of this invention may be adjusted to place the camera 56 in the center point of ruler 40 at substantially the central axis of the conduit. The first and second ring skid legs 20 and 21 form a collapsing telescoping like structure permitting first and second bottom skids 25 and 26 to be varied in distance from the central body 10. When a desired adjustment has been obtained bottom skid bracket securing bolts 24 are tightened maintaining central body 10 substantially at the center of the conduit 55 to be inspected. As either species of the device is moved through the conduit 55 the closed circuit TV camera system is activated resulting in a picture as substantially illustrated in FIG. 6. In the event the spring loaded deflection arm 37 moves up or down the variation in the ruler 40 is observed on the TV monitor as schematically illustrated in FIG. 6. Knowing the position in the conduit 55 of the device the damaged area is readily apparent to the operator on the surface. The devices of this invention have many utilizations in inspecting the interior of conduits 55 and pipelines. The specific problem being solved at the inception of this invention was the development of the device which could ascertain the degree of erosion in concrete sewer lines. The characteristic of sewage and sewage gases create an acid atmosphere in the region of the sewer above the liquid level. This acid atmosphere erodes the calcium in the upper extremities of a concrete sewer line. The device of this invention, accordingly, in such a circumstance would cause the upward movement of deflection arm 37 when a substantially eroded area is reached. This device would, accordingly, indicate perforation or impending perforation of the upper extremities of the conduit 55. The device of this invention would also be useful in locating the deformation of the interior dimensions of plastic pipe. In extremely light colored pipe, such as asbestos cement construction, or an extremely dark pipe, such as black or blue plastics, the light contrasts of the internal of the conduit is quite limited. Visual observation frequently is not adequate to ascertain eroded or collapsed areas. A device of this invention gives a positive accurate measurement of the movement of deflection arm 40 under all conditions of light or contrast.

The device of the first species of the invention might be employed with any closed circuit television camera of suitable dimensions mounted in the mounting rings 11 and 12 of the device. The second species of the invention is susceptible of being employed with any skid mounted closed circuit television camera for determining the interior conditions of the conduit.

Having described in detail the construction and utilization of two configurations of the invention in the first and second species, what is desired to be claimed is all adaptations or modifications of this invention not departing from the scope or equivalents of the inventions as defined in the appended claims.

I claim:

1. A deflection device for measuring the interior of a conduit having a central axis substantially parallel to the earth's surface, said conduit having a top portion above said central axis and a bottom portion below said central axis, said deflection device comprising:
   a. an elongated central body projecting on the said central axis of said conduit, said elongated central body mounted on,
   b. elongated skid means supporting said central body movably in the said bottom portion of said conduit,
   c. a spring loaded deflection arm mounted on said elongated body, said spring loaded deflection arm projecting away from said skid means and being biased into contact with, the top portion of said conduit, and moving responsive to said deflection arm contacting a surface, and
   d. an elongated ruler fixedly attached at one end to said deflection arm and operatively connected to said body to extend toward said central axis, said ruler moving responsive to movement of said deflection arm.

2. The invention of claim 1 wherein said spring loaded deflection arm is constructed of flexible spring steel.

3. The invention of claim 1 further comprising:
   a. a guide arm projecting on a common plane with said deflection arm, said elongated ruler extending between said deflection arm, and
   b. a ruler slide securely attached to an end of said guide arm.

4. The invention of claim 1 wherein said skid means comprises:
   a. segmented mounting rings encircling said elongated central body,
   b. pivotally mounted skid legs extending from said mounting rings to,
   c. elongated bottom skids, and
   d. frictional adjustable securing bolts secured to said bottom skids for securing said skid legs in any desired selected position along the length of said bottom skids.

5. The invention of claim 1 wherein:
   a. said spring loaded deflection arm is mounted on a common plane with the central axis of said elongated central body,
   b. a ruler roller is mounted on an extension of said elongated central body,
   c. said ruler extending from said deflection arm and extending partially around said ruler roller, to
   d. spring tensioning means internal of said elongated central body tensioning said ruler.

6. The invention of claim 5 wherein said spring tensioning means comprises:
   a. a running block,
   b. a sheave rotatably mounted on said running block, and
   c. a spring secured to said running block and extending between said running block a portion of said elongated central body.

7. The invention of claim 5 further comprising a ruler reference secured to said elongated central body and projecting around said ruler roller.

8. The invention of claim 1 further comprising:
   a. a TV camera encased in said elongated central body, and
   b. light means in association with said TV camera adapted to illuminate said ruler permitting electronic photographing of said ruler.

* * * * *

UNITED STATES PATENT OFFICE
CERTIFICATE OF CORRECTION

Patent No. 4,085,510            Dated April 25, 1978

Inventor(s) John A. Kirschke

It is certified that error appears in the above-identified patent and that said Letters Patent are hereby corrected as shown below:

Column 6, line 26, after "block" insert -- and --.

Signed and Sealed this

Fifth Day of September 1978

[SEAL]

Attest:

RUTH C. MASON
*Attesting Officer*

DONALD W. BANNER
*Commissioner of Patents and Trademarks*